US005933957A

United States Patent [19]

Haase

[11] Patent Number: 5,933,957

[45] Date of Patent: Aug. 10, 1999

[54] TRUSS ASSEMBLY APPARATUS WITH INDEPENDENT ROLLER DRIVE

[75] Inventor: Christopher L. Haase, Elburn, Ill.

[73] Assignee: MiTek Holdings, Inc., Wilmington, Del.

[21] Appl. No.: 08/951,116

[22] Filed: Oct. 15, 1997

[51] Int. Cl.[6] ........ B23P 11/00

[52] U.S. Cl. ........ 29/897.31; 29/432; 29/798; 100/913; 269/910

[58] Field of Search ........ 29/798, 897.31, 29/432; 100/210, 913; 227/152; 269/910

[56] References Cited

U.S. PATENT DOCUMENTS

| | | | |
|---|---|---|---|
| 3,212,694 | 10/1965 | Sanford | 227/152 |
| 3,255,943 | 6/1966 | Sanford | 227/152 |
| 3,413,703 | 12/1968 | Sanford . | |
| 3,419,205 | 12/1968 | Jureit et al. . | |
| 3,538,843 | 11/1970 | Lubin | 100/210 |
| 3,540,107 | 11/1970 | Jureit et al. . | |
| 3,667,379 | 6/1972 | Templin | 100/210 |
| 3,855,917 | 12/1974 | Farrell et al. | 100/210 |
| 3,925,870 | 12/1975 | Adams | 29/432 |
| 4,295,269 | 10/1981 | Wright . | |
| 4,351,465 | 9/1982 | Moehlenpah et al. . | |
| 4,373,652 | 2/1983 | Matlock et al. . | |
| 4,437,234 | 3/1984 | Thornton | 29/798 |
| 5,092,028 | 3/1992 | Harnden | 269/910 |
| 5,111,861 | 5/1992 | Gore et al. | 100/913 |
| 5,211,108 | 5/1993 | Gore et al. | 100/210 |
| 5,553,375 | 9/1996 | Powers | 29/798 |
| 5,768,769 | 6/1998 | Shamblin | 29/798 |

*Primary Examiner*—David P. Bryant
*Attorney, Agent, or Firm*—Armstrong Teasdale LLP

[57] ABSTRACT

Methods and apparatus for assembling a truss are described. In one embodiment, the truss table apparatus includes a truss table and a roller assembly. The truss table includes two guides and a worksurface which supports the truss members as nailing plates are pressed into the truss members. The guides are coupled to opposing sides of the truss table and are substantially C-shaped. The roller assembly is movably coupled to the truss table guides and includes a roller for pressing the nailing plates into the truss members. The roller assembly also includes a plurality of drive wheels that rest on the truss table guides to move the roller assembly relative to the truss table. The roller assembly further includes a plurality of pressure wheels rotatably coupled to the truss table to maintain the proper spacing between the roller and the truss table worksurface during pressing of the nailing plates. The apparatus also includes at least one camber tube and at least one outer rail for clamping the truss to the worksurface prior to pressing the nailing plates into the truss members.

19 Claims, 3 Drawing Sheets

TRUSS ASSEMBLY APPARATUS WITH INDEPENDENT ROLLER DRIVE

FIELD OF THE INVENTION

This invention relates generally to an apparatus for use in the manufacture of trusses and, more particularly, to methods and apparatus for assembling a prefabricated truss.

BACKGROUND OF THE INVENTION

Prefabricated trusses are often used in the construction of building structures because of their strength, reliability, low cost, and ease of use. The trusses are typically assembled in a factory using machinery for mass-fabrication of individual truss components. The trusses are assembled, for example, on large assembly tables and then shipped to construction sites.

A prefabricated truss typically includes truss members coupled by nailing plates. Each truss member has a first surface and a second surface, and the truss members are pre-cut for a predefined truss configuration. In assembling the truss, the truss members are arranged on a long truss assembly table and nailing plates are placed over the first surface of the truss members. The plates are then pressed into the truss members using, for example, a roller or a vertical press. The truss is then manually flipped over and nailing plates are positioned over the second face of the truss members and pressed thereto. The completed truss is then removed from the assembly table.

Modern gantry presses, or roller presses, include a gantry frame that travels on two guide tracks mounted to the floor along each side of the truss table. A roller is mounted to the gantry frame at a predetermined distance above a truss table worksurface so that as the gantry frame is moved along the guide tracks, the roller presses the nailing plates into the truss members. The gantry press typically presses the nailing plates into the wood truss members to a depth of 50–80% of the total length of the nailing plate projections. The truss may then be passed through a finishing press, which includes a pair of nip rollers, to fully press the nailing plates into the truss members.

The installation of the gantry press guide tracks is critical in the proper operation of the gantry press. In a typical installation, the guide tracks are spaced away from the sides of the truss table to provide adequate clearance for the gantry press. Since the gantry press rides on the guide tracks, the tracks must be level and true with respect to the truss table worksurface. Due to the size and weight of the gantry press, the guide tracks must be securely fastened to the floor and made of a suitable material, typically, steel. During use of the truss table, an operator is required to place the truss members and nailing plates on the truss table worksurface, requiring the operators to step over the guide tracks, if possible, or stand farther from the table and extend the truss members and nailing plates an additional distance. Due to the size and spacing of the guide tracks, easy access to the truss table worksurface is impeded and throughput is reduced.

It would be desirable to provide an apparatus which enables fabricating a truss without requiring that guide tracks be placed on the floor next to the truss table. It would also be desirable to provide an apparatus which does not require a finishing roller to fully press in the nailing plates.

SUMMARY OF THE INVENTION

These and other objects may be obtained by a truss assembly apparatus which, in one embodiment includes a substantially rectangular shaped truss table having two longitudinal sides, a worksurface, and two ends. Each longitudinal side includes a substantially C-shaped elongate member, or guide, extending the length of the truss table. At least one camber tube and at least one outer rail are provided to clamp the truss members in position over the worksurface.

The apparatus also includes a roller assembly for pressing the nailing plates into the truss members. The roller assembly includes a substantially cylindrical shaped roller and a substantially inverted U-shaped frame. The roller is rotatably coupled to the frame and sized to press the nailing plates in to the truss members as roller assembly moves between the ends of the truss table. The roller assembly further includes a plurality of drive wheels and a plurality of pressure wheels. Each substantially frustro-conical shaped drive wheel is coupled to the frame and sized to rest on a truss table guide to move the roller assembly relative to the truss table. Each pressure wheel is substantially spool shaped and movably coupled to the frame and sized to rest against the truss table when the roller is adjacent to the truss. A motor is coupled to the roller and the drive wheels to drive the roller and the drive wheels at the same speed. The apparatus moves between the ends of the truss table by rotation of the roller and the drive wheels.

To fabricate a truss using the above described truss assembly apparatus, the truss members are positioned on the truss table worksurface. A first camber tube is then moved toward a first outer rail to clamp, or trap, the truss members in place. The nailing plates are then positioned over the truss member first surfaces and are pressed into the truss members using the roller assembly. Specifically, the roller assembly roller presses the nailing plates into the truss members by moving between the ends of the truss table. The roller assembly is moved by energizing the motor so that the roller and drive wheels rotate. The drive wheels move the roller assembly relative to the truss table until the roller is adjacent the truss members. After the roller is adjacent to the truss members, the roller rolls onto the first surface of the truss and the nailing plates. The nailing plates are fully pressed into the truss members as a result of proper roller and pressure wheel spacing. The roller is spaced above the worksurface so that as the roller rolls onto the nailing plates the roller assembly is raised. This raised position removes the drive wheels from the guides and places the weight of the entire roller assembly on the nailing plates. Additionally, as the roller assembly is raised, the pressure wheels are placed against the truss table so that the upward movement of the roller assembly is limited. While the roller assembly is in the raised position, the rotation of the roller against the truss members and the nailing plates moves the roller assembly relative to the table. After traveling the entire length of the truss, the roller assembly will drop slightly as the roller rolls off the truss so that the drive wheels are placed against the guides. The drive wheels then continue movement of the roller assembly until stopped by the operator or the roller assembly reaches the end of the truss table. The first camber tube is then moved away from the truss members so that the members are no longer clamped in place and the truss is flipped over and placed on the worksurface between a second camber tube and a second outer rail. The second camber tube is moved toward the truss so that the truss is clamped between the camber tube and the outer rail and the nailing plates are positioned over the truss members. After reversing the rotational direction of the motor, the roller assembly is moved between the ends of the truss table in the manner described above so that the nailing plates are press into the truss members. The second camber tube is then moved away from the truss members so that the truss is no longer clamped in place. The truss is then removed from the truss assembly.

The above described apparatus facilitates fabricating a truss without requiring floor mounted guide tracks. In addition, such apparatus presses the nailing plates into the truss members without requiring a finishing press, therefore saving time.

DETAILED DESCRIPTION

Figure 1:
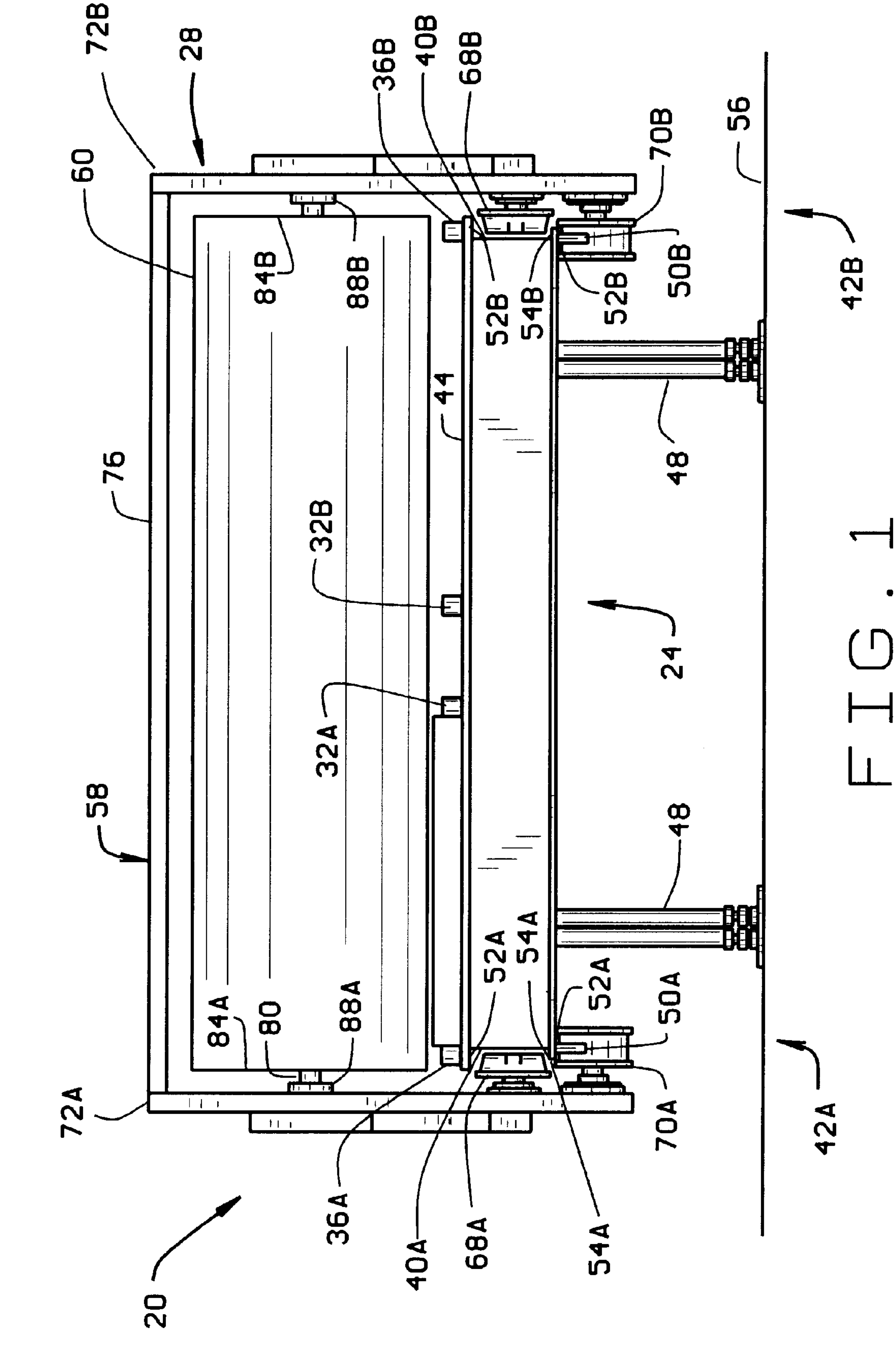
FIG. 1 is an end view of a truss assembly apparatus in accordance with one embodiment of the present invention.

FIG. 1 is an end plan view of a truss assembly apparatus 20 in accordance with one embodiment of the present invention. Truss assembly apparatus 20 includes truss table 24, roller assembly 28, camber tubes 32A and 32B, and outer rails 36A and 36B. Truss table 24 includes respective guides, or side channels, 40A and 40B, first and second sides 42A and 42B, a worksurface 44, beam legs 48, stops 50A, 50B, 50C and 50D (only two shown in FIG. 1), and wheel flanges 52A and 52B. Side channels 40A and 40B are substantially C-shaped having respective top and bottom webs 53A and 53B and 54A and 54B. Channels 40A and 40B are coupled to respective truss table first and second sides 42A and 42B and extend the length of truss table 24 below worksurface 44. Beam legs 48 are substantially elongate members extending from truss table 24 to a floor 56. Stops 50A, 50B, 50C, and 50D are substantially elongate members sized to stop movement of roller assembly 28. Stops 50A, 50B, 50C, and 50D are coupled to truss table 24 and are made of steel or similar material. Wheel flanges 52A and 52B are substantially elongate members extending the length of truss table 24 and are coupled to a bottom of respective side channel bottom webs 54A and 54B.

Roller assembly 28 includes a frame 58, a roller 60, four drive wheel 68A, 68B, 68C, and 68D (only two shown in FIG. 1), and four pressure wheels 70A, 70B, 70C, and 70D (only two shown in FIG. 1). Frame 58 includes first and second end portions 72A and 72B, and top portion 76 coupled between end portions 72A and 72B. First and second end portions 72A and 72B and top portion 76 are substantially rectangular shaped. Roller 60 is substantially cylindrical shaped with a center shaft 80 extending from roller first and second ends 84A and 84B. Roller 60 is made of steel or similar material to apply necessary compressive force without significant flexing. Roller shaft 80 is rotatably coupled to take-up bearings 88A and 88B. Take-up bearings 88A and 88B are movably coupled to frame ends 72A and 72B. Substantially frustro-conical shape drive wheels 68A and 68C, and 68B and 68D extend into respective channels 40A and 40B. Drive wheels 68A, 68B, 68C, and 68D are rotatably coupled to frame 58 and sized to ride on channel member bottom webs 52A and 52B. Pressure wheels 70A, 70B, 70C and 70D are substantially spool shaped and movably coupled to frame 58. Pressure wheels 70A and 70C, and 70B and 70D are sized to be placed adjacent to respective wheel flanges 52A and 52B to maintain proper spacing between roller 60 and worksurface 44. Camber tubes 32A and 32B and outer rails 36A and 36B are substantially elongate members movably coupled to worksurface 44.

Figure 2:
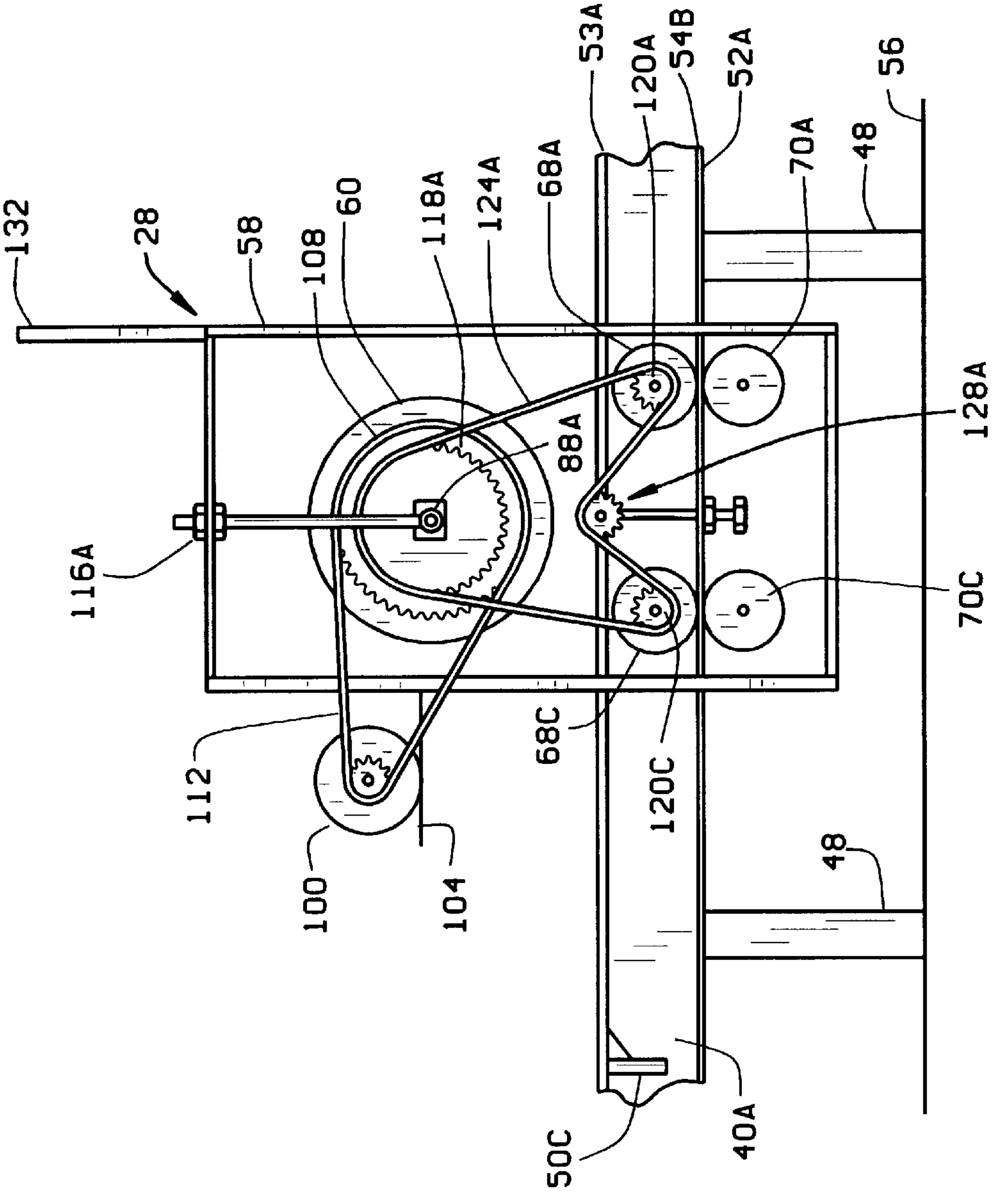
FIG. 2 is a side view of the truss assembly apparatus shown in FIG. 1, with parts cut-away from the roller assembly.

Referring to FIG. 2, roller assembly 28 further includes a motor 100, a motor mounting plate 104, a roller sprocket 108, a roller chain 112, and two roller adjustment subassemblies 116A and 116B (only one shown in FIG. 2). Motor 100, for example, a bidirectional electric motor, is coupled to frame 58 using mounting plate 104. Roller sprocket 108 is coupled to roller shaft 80. Roller sprocket 108 is rotatably coupled to motor 100 using roller chain 112. Motor 100 is movably coupled to mounting plate 104 so that tension of roller chain 112 may be adjusted. Roller adjustment subassemblies 116A and 116B are coupled to respective take-up bearings 84A and 84B so that roller 60 may be adjusted up and down relative to worksurface 44. In addition, roller assembly 28 includes drive sprockets 118A and 118B (only one shown in FIG. 2), four drive wheel sprockets 120A, 120B, 120C, and 120D (only two shown in FIG. 2), first and second drive chains 124A and 124B (only one shown in FIG. 2), two chain take-up subassemblies 128A and 128B (only one shown in FIG. 2), and a mast 132. Drive sprockets 118A and 188B are coupled to roller shaft 80 at respective roller ends 84A and 84B. Drive wheels 68A and 68C are rotatably coupled to roller 60 using drive sprocket 118A, drive wheel sprockets 120A and 120C, and drive chain 124A. Drive wheels 68B and 68D are similarly rotatably coupled to roller 60 using drive sprocket 118B, wheel sprockets 120B and 120D, and second drive chain 124B. Sprockets 118A, 118B, 120A, 120B, 120C, and 120D are sized so that roller 60 and drive wheels 68A, 68B, 68C, and 68D rotate at a same speed. Tension of first drive chain 124A is adjusted using chain take-up subassembly 128A. Tension of second drive chain 124B is similarly adjusted using chain take-up subassembly 128B. Mast 132 is a substantially elongate member coupled to frame 58 to support power source interconnections (not shown) to truss table apparatus 20.

Figure 3:
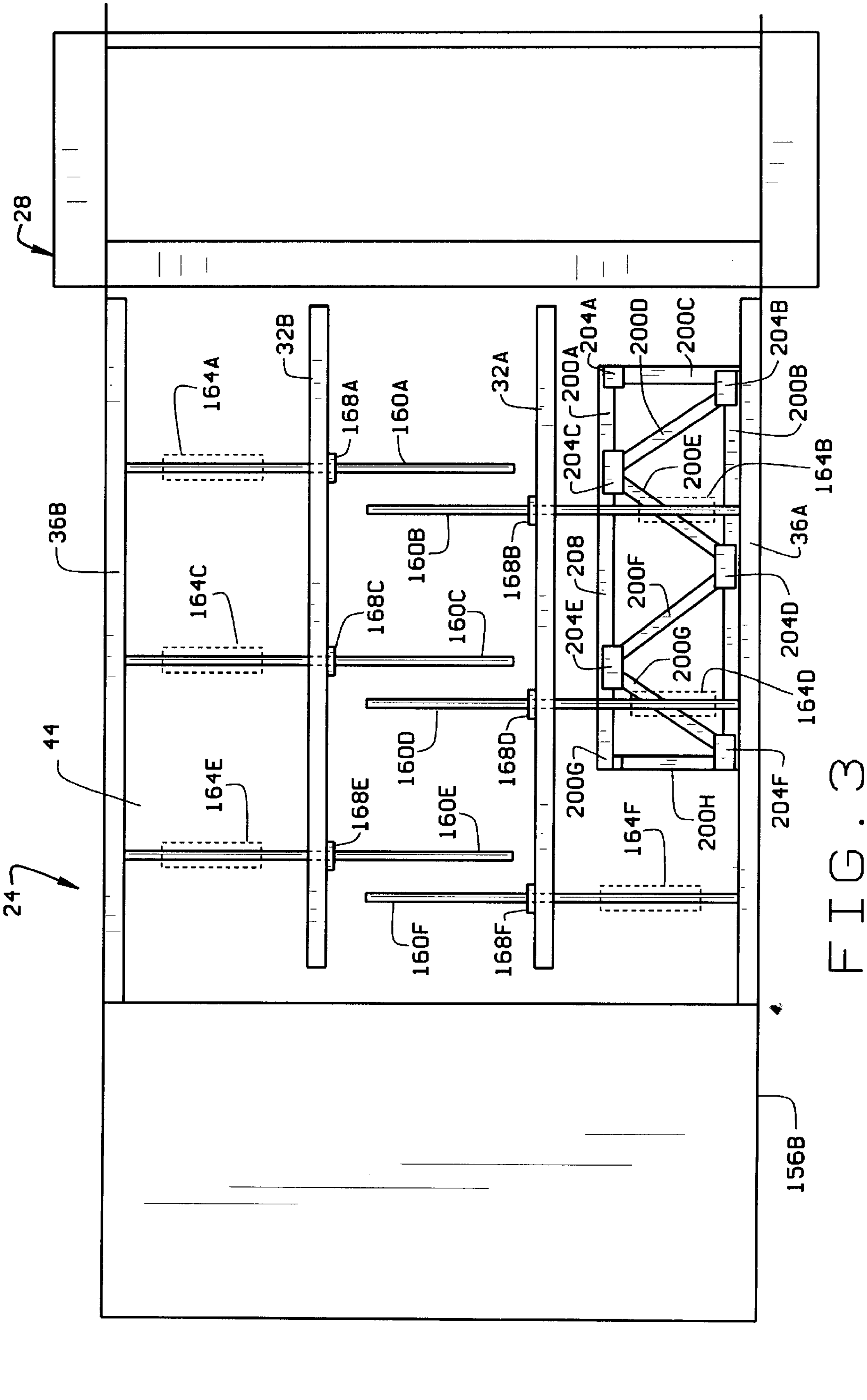
FIG. 3 is a top view of the truss assembly apparatus shown in FIG. 1.

FIG. 3 is a top plan view of a truss table apparatus 20. Truss table 24 further includes first and second ends 156A and 156B, camber connection slots 160A, 160B, 160C, 160D, 160D, 160E, and 160F extending through worksurface 44, actuators 164A, 164B, 164C, 164D, 164E, and 164F positioned below truss table worksurface 44, and connecting plates 168A, 168B, 168C, 168D, 168E, and 168F. In one embodiment, actuators 164A, 164B, 164C, 164D, 164E, and 164F are pneumatic cylinders sized to position respective camber tubes 32A and 32B toward or away from respective outer rails 36A and 36B. Cylinders 164A, 164B, 164C, 164D, 164E, and 164F are coupled between truss table 24 and respective connecting plates 168A, 168B, 168C, 168D, 168E, and 168F. Connecting plates 168B, 168D, and 168F extend through respective connection slots 160B, 160D, and 160F and are coupled to camber tube 32A. Connecting plates 168A, 168C, and 168E extend through respective connection slots 160A, 160C, and 160E and are coupled to camber tube 32B. A truss 196 includes truss members 200A, 200B, 200C, 200D, 200E, 200F, 200G and 200H and nailing plates 204A, 204B, 204C, 204D, 204E, 204F, and 204G. Truss 196 includes a first surface 208 and a second surface (not shown).

Generally, truss members 200A, 200B, 200C, 200D, 200E, 200F, 200G and 200H are placed on truss table 24 and nailing plates 204A, 204B, 204C, 204D, 204E, 204F, and 204G are placed over upwardly facing truss first surface 208. Nailing plates 204A, 204B, 204C, 204D, 204E, 204F, and 204G are then pressed into truss members 200A, 200B, 200C, 200D, 200E, 200F, 200G, and 200H using roller assembly 28. Truss 196 is then flipped over, and nailing plates (not shown) are placed over truss second surface (not shown) and pressed into truss members 200A, 200B, 200C, 200D, 200E, 200F, 200G, and 200H using roller assembly 28. More particularly, truss members 200A, 200B, 200C, 200D, 200E, 200F, 200G, and 200H are positioned on truss table worksurface 44 between camber tube 32A and outer rail 36A. Camber tube 32A is moved toward outer rail 36A by activating cylinders 164B, 164D, and 164F so that truss members 200A, 200B, 200C, 200D, 200E, 200F, 200G, and 200H are clamped therebetween. Nailing plates 204A, 204B, 204C, 204D, 204E, 204F, and 204G are then placed over the truss member intersections (not shown) and pressed into truss members 200A, 200B, 200C, 200D, 200E, 200F, 200G, and 200H by moving roller assembly 28 between truss table ends 156A and 156B. Specifically, motor 100 is energized so that roller chain 112 rotates roller 60. Rotation of roller 60 results in movement of first and second drive chains 124A and 124B so that drive wheels 68A, 68B, 68C, and 68D rotate. The rotation of drive wheels 68A, 68B, 68C, and 68D against side channels 40A and 40B move roller assembly 28 relative to truss table 24. In one embodiment, roller assembly 24 begins at truss table end 156A and moves to end 156B. When roller 60 becomes adjacent to truss members 200A, 200B, and 200C, roller 60 rolls onto truss first surface 208 and nailing plates 204A and 204B so that roller assembly 28 is raised by the thickness of nailing plates 204A and 204B. As roller assembly 28 is raised, drive wheels 68A, 68B, 68C, and 68D become spaced from side channel bottom webs 54A and 54B and pressure wheels 70A, 70B, 70C, and 70D become adjacent to wheel flanges 52A and 52B. Pressure wheels 70A, 70B, 70C, and 70D limit the upward movement of roller assembly 28 to the thickness of nailing plates 204. After drive wheels 68A, 68B, 68C, and 68D are removed from channels 40A and 40B, movement of roller assembly 28 results from rotation of roller 60 against truss 196. Upon roller 60 becoming adjacent to nailing plates 204A and 204B, the forward movement and weight of roller 60 fully press projections of nailing plates 204A and 204B into truss members 200A, 200B, and 200C. Roller assembly 28 continues moving towards truss table end 156B and presses in nailing plates 204C, 204D, 204E, 204F, and 204G in a manner similar to nailing plates 204A and 204B. When roller 60 moves beyond truss 196, roller assembly 28 drops by the thickness of nailing plates 204F and 204G and drive wheels 68A, 68B, 68C, and 68D are placed on side channel bottom webs 54A and 54B so that roller assembly 28 continues moving toward end 156B. Motor 100 is de-energized when roller assembly 28 becomes adjacent to stops 52C and 52D.

Camber tube 32A is then moved away from truss 196 using cylinders 164B, 164D, and 164F. Truss 196 is flipped over so that truss first surface 208 is adjacent to worksurface 44 and positioned between second camber tube 32B and outer rail 36B. Cylinders 164A, 164C, and 164E are activated so that camber tube 32B is moved toward outer rail 36B clamping truss 196 between tube 32B and rail 36B. Second face nailing plates (not shown) are positioned at truss member intersections (not shown). The rotational direction of motor 100 is then reversed so that roller assembly 28 moves toward truss table end 156A when energized. Upon energizing motor 100, drive wheels 68A, 68B, 68C, and 68D move roller assembly 28 relative to truss table 24. Upon roller 60 becoming adjacent to truss 196 roller 60 rolls onto the truss second surface and the second surface nailing plates so that roller assembly 28 will be slightly raised. Raising roller assembly 28 spaces drive wheels 68A, 68B, 68C, and 68D from side channels 40A and 40B and places pressure wheels 70A, 70B, 70C, and 70D adjacent to wheel flanges 52A and 52B. Rotation of roller 60 moves roller assembly 28 relative to truss table 24 and presses the second face nailing plates (not shown) into truss 196 in a manner similar to nailing plates 204A, 204B, 204C, 204D, 204E, 204F, and 204G. Upon roller 60 moving beyond truss 196, roller 60 rolls off truss 196 lowering roller assembly 28 and placing drive wheels 68A, 68B, 68C, and 68D adjacent to side channels 40A and 40B. Drive wheels 68A, 68B, 68C, and 68D continue moving roller assembly 28 toward end 156A until adjacent to stops 50A and 50B and motor 100 is de-energized. Camber tube 32B is then moved away from truss 196 using cylinders 164A, 164C, and 164E. Truss 196 is then be removed from truss table apparatus 20.

If the nailing plates, for example, nailing plates 204A, 204B, 204C, 204D, 204E, 204F, and 204G are not properly pressed into truss 196, several adjustments can be made. To function properly, roller 60 must be properly spaced above worksurface 44. Roller 60 is adjusted using roller adjustment subassemblies 116A and 116B so that roller 60 is spaced from worksurface 44 a distance equal to the thickness of truss 196 plus the thickness of a nailing plate excluding the projections, such as nailing plate 204A. For example, in assembling a floor truss, a typical 2×4 truss member is positioned on worksurface 44 in the 4×2 orientation with the truss member thickness approximately three and one-half inches. A typical nailing plate excluding the projections is one-sixteenth of an inch. As a result, roller 60 is spaced three and nine-sixteenths of an inch above worksurface 44. Specifically, chain take-up subassemblies 128A and 128B are adjusted so that drive chains 124A and 124B are loose. Roller adjustment subassemblies 116A and 116B are then adjusted so that roller 60 is moved the proper distance from worksurface 44. Roller 60 must be parallel to worksurface 44 and properly spaced after completion of adjustment of roller adjustments 116A and 116B. After completing adjustments of roller adjustment subassemblies 116A and 116B, chain take-up subassemblies 128A and 128B are adjusted to properly tension drive chains 124A and 124B. Additionally, pressure wheels 70A, 70B, 70C, and 70D may require adjustment so that spacing between wheel flanges 52A and 52B is equal to the thickness of a nailing plate excluding the projections, for example, nailing plate 204A. Using the above-described example, pressure wheels 70A, 70B, 70C, and 70D would be spaced one-sixteenth of an inch from wheel flanges 52A and 52B. Specifically, pressure wheels 70A, 70B, 70C, and 70D are repositioned relative to frame 58 so that pressure wheels 70A, 70B, 70C, and 70D are properly spaced from wheel flanges 52A and 52B. Proper spacing of roller 60 and pressure wheels 70A, 70B, 70C, and 70D ensure proper installation of nailing plates 204A, 204B, 204C, 204D, 204E, 204F, and 204G. If roller chain 112 tension is improperly adjusted, motor 100 may be repositioned relative to mounting plate 104 until roller chain 112 is properly adjusted.

The above-described apparatus facilitates fabricating a truss without requiring guide tracks be coupled to the floor. In addition, such apparatus presses the nailing plates into the truss without requiring a finishing press or other action.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. For example, the truss assembly was described as a serial process. Such truss table apparatus may, however, also be utilized to assemble multiple trusses simultaneously. For example, after pressing the nailing plates into the truss members and flipping the truss, truss members from a second truss could be positioned on the truss table worksurface between the first camber tube and outer rail. The first and second trusses could then be simultaneously clamped by the camber tubes and the nailing plates positioned such that the roller presses the nailing plates into the first and second truss members simultaneously. After moving the camber tubes, the first completed truss could be removed from the truss table apparatus and the second truss could be flipped. This method of operation could significantly increase production rates. Accordingly, the spirit and scope of the invention are to be limited only by the terms of the appended claims.

I claim:

1. A truss table apparatus for use in connection with assembling a truss, the truss having a plurality of wooden truss members and a plurality of nailing plates, said truss table apparatus comprising:

a truss table comprising at least two guides coupled to said truss table and a worksurface on which the truss may be positioned; and a roller assembly movably coupled to said truss table guides, said roller assembly configured to press the nailing plates into the truss members, said roller assembly comprising a plurality of drive wheels for moving said roller assembly relative to the truss table worksurface.

2. A truss table apparatus in accordance with claim 1 wherein each said truss table guide comprises a C-shaped channel member having a top and a bottom.

3. A truss table apparatus in accordance with claim 2 wherein said plurality of drive wheels are configured to extend into said C-shaped side channel members.

4. A truss table apparatus in accordance with claim 3 wherein said roller assembly comprises four drive wheels.

5. A truss table apparatus in accordance with claim 3 wherein said roller assembly further comprises a roller and a motor, said roller configured to press the nailing plates in the truss members, said motor configured to be rotatably coupled to said roller and said drive wheels.

6. A truss table apparatus in accordance with claim 5 wherein said roller and said drive wheels rotate at a same speed.

7. A truss table apparatus in accordance with claim 2 wherein said truss table further comprises a wheel flange coupled to each said channel member bottom, and wherein said to roller assembly comprises a plurality of pressure wheels configured to be placed against said wheel flanges when said roller assembly becomes adjacent to the truss.

8. A truss table apparatus in accordance with claim 1 wherein said truss table comprises two camber tubes movably coupled to said truss table worksurface for clamping the truss members to said worksurface.

9. A truss table apparatus in accordance with claim 8 wherein said truss table further comprises a plurality of camber connection slots extending through said worksurface, a plurality of camber cylinders positioned below said truss table worksurface, and a plurality of camber connecting plates extending through said connection slots and coupled to said tubes and said cylinders.

10. A method of assembling a truss utilizing a truss table apparatus, the truss having a first surface, a second surface, at least two truss members, and a plurality of nailing plates, the nailing plates configured to couple the truss members, the truss table apparatus including a truss table having at least two guides and a worksurface, and a roller assembly movably coupled to the truss table guides, the roller assembly comprising a motor, a roller, and a plurality of drive wheels, said method comprising the steps of:

positioning the truss members on the truss table apparatus so that the truss second face lies on the truss table worksurface;

positioning at least one nailing plate over the truss member first surface;

pressing the nailing plate into the truss members with the roller assembly by activating the motor so that and the drive wheels move the roller assembly relative to the truss table;

repositioning the truss so that the truss first surface lies on the truss table worksurface;

positioning at least one nailing plate over the truss member second surface; and pressing the nailing plate into the truss members with the roller assembly by activating the motor so that and the drive wheels move the roller assembly relative to the truss table.

11. A method in accordance with claim 10 wherein pressing the nailing plate into the truss members with the roller assembly comprises the step of moving the roller assembly between the ends of the truss table apparatus.

12. A method in accordance with claim 11 wherein the roller assembly includes a plurality of pressure wheels, and wherein moving the roller assembly between the ends of the truss table apparatus further includes the step of positioning the pressure wheels adjacent to the guides so that the roller assembly is properly spaced from the truss table worksurface.

13. A method in accordance with claim 10 wherein the truss table apparatus includes a movable camber tube and an outer rail, and wherein positioning the truss members on the truss table apparatus so that the truss second face lies on the truss table worksurface further comprises the step of moving the camber tube towards the outer rail so that the truss is clamped to the truss table worksurface.

14. A method in accordance with claim 13 wherein the truss table apparatus includes a plurality of slots extending through the truss table worksurface and a plurality of cylinders positioned below the worksurface and coupled to the truss table and the camber tube, and wherein moving the camber tube towards the outer rail comprises the step of activating the cylinder so that the camber tube moves toward the outer rail.

15. A method in accordance with claim 13 wherein the truss table apparatus includes a second movable camber tube and a second outer rail, and wherein positioning the truss members on the truss table apparatus so that the truss first face lies on the truss table worksurface further comprises the step of moving the second camber tube towards the second outer rail so that truss is clamped to the truss table worksurface.

16. A method in accordance with claim 10 wherein positioning at least one nailing plate over the truss member second surface and pressing the nailing plates into the truss members with the roller assembly comprises the step of moving the roller assembly between the ends of the truss table apparatus.

17. A roller apparatus for use in connection with assembling a truss on a truss table, the truss having a plurality of wooden truss members and a plurality of nailing plates, the truss table having at least two guides and a worksurface, said roller apparatus comprising:

a frame;

a roller coupled to said frame configured to press the nailing plates into the truss members; and a plurality of drive wheels coupled to said frame configured to movably couple to the truss table guides.

18. A roller apparatus in accordance with claim 17 further comprising a plurality of pressure wheels coupled to said frame configured to rotatably couple to said truss table.

19. A roller apparatus in accordance with claim 18 wherein said roller and said drive wheels rotate at a same speed.

* * * * *